US012577988B2

(12) United States Patent
Hashizume et al.

(10) Patent No.: US 12,577,988 B2
(45) Date of Patent: Mar. 17, 2026

(54) BEARING APPARATUS

(71) Applicant: NTN Corporation, Osaka (JP)

(72) Inventors: Shohei Hashizume, Kuwana (JP); Keiichi Ueda, Kuwana (JP); Yasuyuki Hamakita, Kuwana (JP)

(73) Assignee: NTN Corporation, Osaka (JP)

( * ) Notice: Subject to any disclaimer, the term of this patent is extended or adjusted under 35 U.S.C. 154(b) by 88 days.

(21) Appl. No.: 18/021,783

(22) PCT Filed: Sep. 8, 2021

(86) PCT No.: PCT/JP2021/032958
§ 371 (c)(1),
(2) Date: Feb. 16, 2023

(87) PCT Pub. No.: WO2022/059572
PCT Pub. Date: Mar. 24, 2022

(65) Prior Publication Data
US 2023/0400064 A1 Dec. 14, 2023

(30) Foreign Application Priority Data
Sep. 15, 2020 (JP) ................................. 2020-154234

(51) Int. Cl.
*F16C 41/00* (2006.01)
*F16C 19/52* (2006.01)
*F16C 35/067* (2006.01)

(52) U.S. Cl.
CPC ............ *F16C 41/008* (2013.01); *F16C 19/52* (2013.01); *F16C 35/067* (2013.01); *F16C 2233/00* (2013.01)

(58) Field of Classification Search
CPC ...... F16C 19/52; F16C 19/522; F16C 19/525; F16C 19/527; F16C 33/80; F16C 41/00; F16C 41/008; F16C 2233/00
See application file for complete search history.

(56) References Cited

U.S. PATENT DOCUMENTS

2003/0048962 A1    3/2003    Sato et al.
2003/0093188 A1    5/2003    Morita et al.

FOREIGN PATENT DOCUMENTS

CN          1405543 A          3/2003
CN          1412564 A          4/2003
(Continued)

OTHER PUBLICATIONS

Translation of JP2020-60227 obtained Oct. 3, 2024.*
(Continued)

*Primary Examiner* — James Pilkington
(74) *Attorney, Agent, or Firm* — Rimon P.C.

(57) ABSTRACT

A bearing apparatus includes a housing where a main spindle is accommodated, a bearing including an inner ring and an outer ring, the bearing supporting the main spindle rotatably with respect to the housing, a retaining lid fitted to an inside surface of the housing while the retaining lid is in contact with an axial end surface of the housing and an axial end surface of the outer ring, and a communication module arranged in a region opposed to the retaining lid with the bearing being interposed, the communication module wirelessly communicating over electromagnetic waves. In a portion of the retaining lid in contact with the housing, a non-metallic layer composed of ceramic which is a non-metallic material is provided.

5 Claims, 4 Drawing Sheets

(56)                References Cited

FOREIGN PATENT DOCUMENTS

| | | | |
|---|---|---|---|
| DE | 10137785 | A1 | 2/2003 |
| DE | 102011086550 | A1 | 5/2013 |
| JP | 55-151923 | U1 | 11/1980 |
| JP | 61-92320 | A | 5/1986 |
| JP | 2003-028151 | A | 1/2003 |
| JP | 2007-138974 | A | 6/2007 |
| JP | 2013-17177 | A | 1/2013 |
| JP | 2020-60227 | A | 4/2020 |
| WO | WO-2020189188 | A1 * | 9/2020 | ............. B23Q 11/12 |

OTHER PUBLICATIONS

Translatoin of JP61-92320 obtained Oct. 3, 2024.*
International Search Report issued in International Application No.
PCT/JP2021/032958, dated Nov. 16, 2021, with English translation.

* cited by examiner

BEARING APPARATUS

CROSS-REFERENCE OF RELATED APPLICATIONS

This application is the U.S. National Phase under 35 U.S.C. § 371 of International Patent Application No. PCT/JP2021/032958, filed on Sep. 8, 2021, which in turn claims the benefit of Japanese Patent Application No. 2020-154234, filed on Sep. 15, 2020, the entire disclosures of which Applications are incorporated by reference herein.

TECHNICAL FIELD

This invention relates to a bearing apparatus including a wireless communication function.

BACKGROUND ART

To a machine including a rolling mechanism or a swing mechanism employed in a main spindle or the like of a machine tool, in order to control the machine or to monitor a state of the machine, a detection device such as a sensor may be attached. In particular, in the machine including a rolling bearing, it is effective to detect characteristics in the vicinity of the bearing in the inside of the machine. Therefore, various sensors such as a rotation sensor and a temperature sensor are desirably arranged in the vicinity of the bearing in the inside of the machine.

Electrical wires have conventionally often been used for transmission of data detected by the sensors. Arrangement of electrical wires in the inside of the machine, however, may cause interference with another mechanism in the inside of the machine or lowering in function of that mechanism (for example, lowering in accuracy of dimension or shape). Ease in assembly of the machine also becomes poor, which may also be a factor for lowering in productivity.

In order to address the problems as above, for example, Japanese Patent Laying-Open No. 2003-28151 (PTL 1) discloses a bearing apparatus in which a wireless sensor with an antenna is attached to an outer ring of a bearing and data detected by the wireless sensor is wirelessly transmitted to the outside over radio waves. In view of the fact that the bearing and peripheral components (a housing, a lid, and the like) are made of a metal (a magnetic material) through which radio waves are less likely to propagate, in the bearing apparatus, a space (a hole or a groove) for facilitating propagation of radio waves transmitted from the wireless sensor to the outside is provided in the inside of the housing located around a portion of attachment of the wireless sensor.

CITATION LIST

Patent Literature

PTL 1: Japanese Patent Laying-Open No. 2003-28151

SUMMARY OF INVENTION

Technical Problem

As described above, in the hearing apparatus disclosed in Japanese Patent Laying-Open No. 2003-28151, a space (a hole or a groove) for facilitating propagation of radio waves is provided in the inside of the housing arranged around the bearing.

In the inside of the housing around the hearing, however, another mechanism for cooling the bearing is normally provided. When interference with another mechanism occurs, a sufficient space may not be provided in the inside of the housing. When a space in a complicated shape is provided in the inside of the housing in order to avoid interference with another mechanism, there is a concern about poor accuracy in shape of the housing or increase in cost.

The present disclosure was made to solve the problems above, and an object thereof is to provide a bearing apparatus capable of wirelessly transmitting data to the outside without providing a space for facilitating propagation of radio waves in the inside of a housing around a bearing.

Solution to Problem (1) A bearing apparatus according to the present disclosure includes a cylindrical housing where a rotating body is accommodated, a first bearing including an inner ring fixed to an outside surface of the rotating body and an outer ring fixed to an inside surface of the housing, the first bearing supporting the rotating body rotatably with respect to the housing, a lid portion fitted to the inside surface of the housing while the lid portion is in contact with an axial end surface of the housing and an axial end surface of the outer ring, and a communication apparatus arranged in a region opposed to the lid portion with the first bearing being interposed, the communication apparatus wirelessly communicating over electromagnetic waves. A non-metallic layer composed of a non-metallic material is formed in at least one of a portion of the lid portion in contact with the housing, a portion of the housing in contact with the lid portion, an inside portion of the lid portion, and a member arranged between an inside surface of the lid portion and an outside surface of the rotating body.

(2) In one aspect, the communication apparatus is arranged in a region between the first bearing and a second bearing arranged at a position opposed to the lid portion with the first beating being interposed. The bearing apparatus further includes a self-generation apparatus arranged in the region between the first bearing and the second bearing, the self-generation apparatus supplying electric power to the communication apparatus.

(3) In one aspect, the non-metallic material is ceramic.

(4) In one aspect, the first bearing is an angular contact ball bearing.

(5) In one aspect, the rotating body is a main spindle of a machine tool.

Advantageous Effects of Invention

According to the present disclosure, a bearing apparatus capable of wirelessly transmitting data to the outside without a space for facilitating propagation of radio waves in the inside of a housing around a beating can be provided.

DESCRIPTION OF EMBODIMENTS

Figure 1:
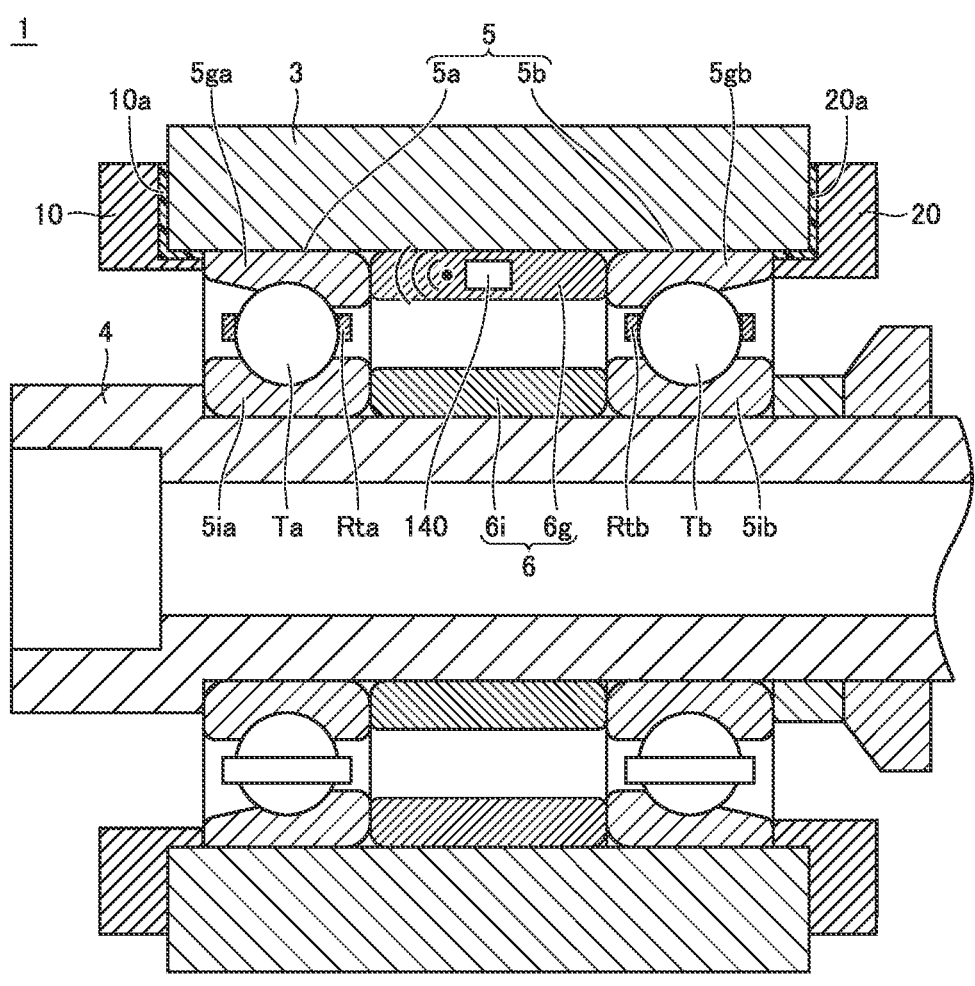
FIG. 1 is a cross-sectional view (No. 1) showing a schematic construction of a bearing apparatus.

An embodiment of the present disclosure will be described below with reference to the drawings. The same or corresponding elements in the drawings below have the same reference characters allotted and description thereof will not be repeated.

First Embodiment

FIG. 1 is a cross-sectional view showing a schematic construction of a bearing apparatus 1 according to the present first embodiment.

Bearing apparatus 1 shown in FIG. 1 is used, for example, as a built-in motor type spindle apparatus of a machine tool. In this case, a not-shown motor is incorporated on one end side (on the right side in FIG. 1) of a main spindle 4 supported by bearing apparatus 1, and a not-shown cutting tool such as an end mill is connected on the other end side (on the left side in FIG. 1). In the present embodiment, a diameter of main spindle 4 is set to 70 mm and a maximum rotation speed of main spindle 4 is set to 20000 rotations/minute.

Bearing apparatus 1 includes a cylindrical housing 3 made of a metal, a bearing 5 including two bearings 5a and 5b, a spacer 6 arranged between bearings 5a, and 5b, retaining lids 10 and 20 made of a metal, and a communication module 140.

Main spindle 4 is provided in the inside of housing 3 and supported by bearings 5a and 5b as being rotatable with respect to housing 3.

Bearing 5a is a rolling bearing including an inner ring 5ia made of a metal, an outer ring 5ga made of a metal, a plurality of rolling elements Ta arranged between inner ring 5ia and outer ring 5ga, and a retainer Rta. The plurality of rolling elements Ta are held at intervals by retainer Rta.

Bearing 5b is a rolling bearing including an inner ring 5ib made of a metal, an outer ring 5gb made of a metal, a plurality of rolling elements Tb arranged between inner ring 5ib and outer ring 5gb, and a retainer Rtb. The plurality of rolling elements Tb are held at intervals by retainer Rtb.

Inner ring 5ia of bearing 5a and inner ring 5ib of bearing 5b that are distant in an axial direction are fitted to main spindle 4 by interference fit (press-fitting).

Spacer 6 includes an inner-ring spacer 6i and an outer-ring spacer 6g. Inner-ring spacer 6i is arranged between inner rings 5ia and 5ib and outer-ring spacer 6g is arranged between outer rings 5ga and 5gb.

An angular contact ball bearing, a deep groove ball bearing, or a tapered roller bearing can be employed as bearings 5a and 5b. The angular contact ball bearing is included in bearing apparatus 1 shown in FIG. 1, where two bearings 5a and 5b are provided in back-to-back duplex bearing (DB) arrangement. Arrangement of the bearing is not limited to back-to-back duplex bearing arrangement, and for example, face-to-face duplex bearing arrangement may be applicable.

Though a structure in which two bearings 5a and 5b support main spindle 4 is illustrated and described, a structure in which two or more bearings support main spindle 4 may be applicable.

A not-shown cooling medium flow path is provided in the inside of housing 3. By feeding a cooling medium through the cooling medium flow path in housing 3, bearings 5a and 5b can be cooled.

Each of retaining lids 10 and 20 is an annular member that suppresses axial displacement of housing 3 from bearings 5a and 5b. Retaining lid 10 is fitted to an inside surface of housing 3 while it is in contact with an axial end surface on one side (in FIG. 1, the left side where the cutting tool is provided) of housing 3 and an axial end surface on one side of outer ring 5ga. Retaining lid 20 is fitted to the inside surface of housing 3 while it is in contact with an axial end surface on the other side (in FIG. 1, the right side where the motor is provided) of housing 3 and an axial end surface on one side of outer ring 5gb.

Communication module 140 containing a sensor is arranged between bearing 5a and bearing 5b. More specifically, communication module 140 is attached in the inside of outer-ring spacer 6g arranged between outer rings 5ga and 5gb. When viewed with bearing 5a being defined as the reference, communication module 140 is arranged in a region opposed to retaining lid 10 with bearing 5a being interposed. When viewed with bearing 5b being defined as the reference, communication module 140 is arranged in a region opposed to retaining lid 20 with bearing 5b being interposed.

Figure 2:
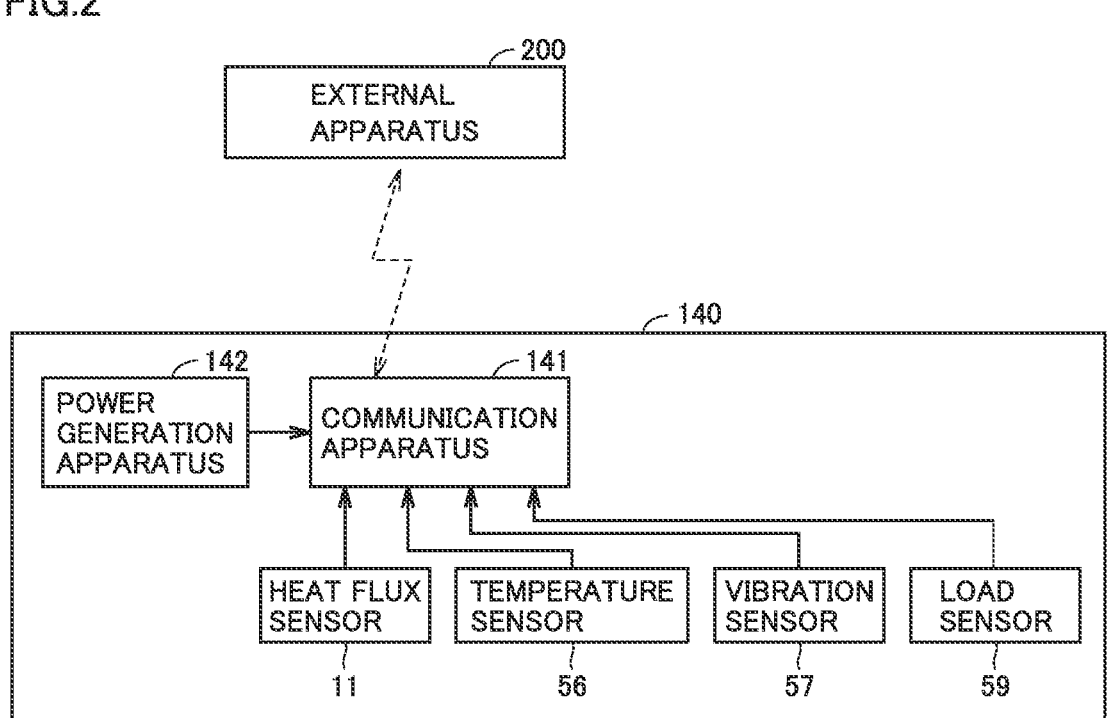
FIG. 2 is a block diagram showing an exemplary configuration of a communication module.

FIG. 2 is a block diagram showing an exemplary configuration of communication module 140 according to the present embodiment. Communication module 140 contains a plurality of sensors (a heat flux sensor 11 that measures a heat flux, a temperature sensor 56 that measures a temperature, a vibration sensor 57 that measures vibration, and a load sensor 59 that measures preload) for controlling main spindle 4 or monitoring a state of bearing apparatus 1, a communication apparatus 141, and a power generation apparatus 142.

Communication apparatus 141 is connected to each sensor through an electrical wire and collects data indicating a result of detection by each sensor. Communication apparatus 141 may wirelessly be connected to each sensor and wirelessly collect data indicating a result of detection by each sensor.

Communication apparatus 141 transmits data collected from each sensor to an external apparatus 200 provided outside bearing apparatus 1 through wireless communication over electromagnetic waves. Communication apparatus 141 is in conformity, for example, with communication standards of Bluetooth®, and can wirelessly transmit data indicating a result of detection by each sensor to external apparatus 200 over radio waves in a frequency band of 2.4 GHz.

Power generation apparatus 142 is connected to communication apparatus 141 and self-generates electric power for driving communication apparatus 141. For example, a thermoelectric element (Peltier element) that generates electric power based on a Seebeck effect can be employed as power generation apparatus 142. When electric power is required for driving each sensor, power generation apparatus 142 may supply electric power to that sensor.

Though an example in which each sensor, communication apparatus 141, and power generation apparatus 142 are modularized into a single communication module 140 and arranged in outer-ring spacer 6g is described in the present embodiment, each sensor, communication apparatus 141, and power generation apparatus 142 may individually be arranged without being modularized.

<As to Wireless Transmission of Data>

As described above, bearing apparatus 1 according to the present embodiment is constructed such that communication module 140 is arranged between bearing 5a and bearing 5b and wirelessly transmits data indicating a result of detection by each sensor to the outside.

Bearing 5a, housing 3 around bearing 5a, and retaining lids 10 and 20, however, are each made of a metal, and hence passage of radio waves from communication module 140 to the outside of bearing 5a and the outside of bearing 5b is difficult.

If a space for facilitating propagation of radio waves is provided in the inside of housing 3 in a radial direction, interference with a cooling medium flow channel in housing 3 and additionally poorer accuracy in shape of housing 3 and increase in cost may disadvantageously be caused.

In view of such a disadvantage, in bearing apparatus 1 according to the present embodiment, as shown in FIG. 1, a non-metallic layer 10a composed of ceramic which is a non-metallic material is provided in a portion of retaining lid 10 in contact with housing 3 (a portion of retaining lid 10 fitted to the inside surface and the axial end surface on one side of housing 3). Similarly, a non-metallic layer 20a composed of ceramic which is a non-metallic material is provided in a portion of retaining lid 20 in contact with housing 3 (a portion of retaining lid 20 fitted to the inside surface and the axial end surface on the other side of housing 3). Examples of ceramic for non-metallic layers 10a and 20a include silicon nitride, alumina, and zirconia.

Thus, in bearing apparatus 1 according to the present embodiment, data from communication module 140 can wirelessly be transmitted to the outside of bearing apparatus 1 through non-metallic layers 10a and 20a provided in the portions of retaining lids 10 and 20 in contact with housing 3. Thus, without providing a space for facilitating propagation of radio waves in the inside of housing 3, data can wirelessly be transmitted to the outside.

Furthermore, in bearing apparatus 1 according to the present embodiment, similarly to communication apparatus 141, power generation apparatus 142 that self-generates electric power for driving communication apparatus 141 is arranged between bearing 5a and bearing 5b. Therefore, communication apparatus 141 can be driven without an electrical wire for supply of drive power to communication apparatus 141 being provided on the outside of beating apparatus 1.

For appropriate wireless transmission of data from communication module 140 to the outside, non-metallic layers 10a and 20a and communication module 140 are desirably arranged at positions as close as possible to each other. FIG. 1 shows an example in which non-metallic layers 10a and 20a are provided in a part of retaining lids 10 and 20 in a circumferential direction. When alignment between non-metallic layers 10a and 20a and communication module 140 is difficult in fitting of retaining lids 10 and 20 to the inside surface of housing 3, non-metallic layers 10a and 20a may be provided to extend over the entirety of retaining lids 10 and 20 in the circumferential direction.

The material for non-metallic layers 10a and 20a should only be a non-metallic material through which electromagnetic waves can pass, and is not limited to the ceramic described above. For example, the material for non-metallic layers 10a and may be a resin material such as polyether ether ketone (PEEK) or polyphenylene sulfide (PPS), a material reinforced with carbon fibers or glass fibers, glass, or rubber.

The non-metallic layer is not necessarily limited to the non-metallic layer provided at each of opposing axial ends of housing 3. In other words, only one of non-metallic layers 10a and 20a may be provided.

Second Embodiment

Figure 3:
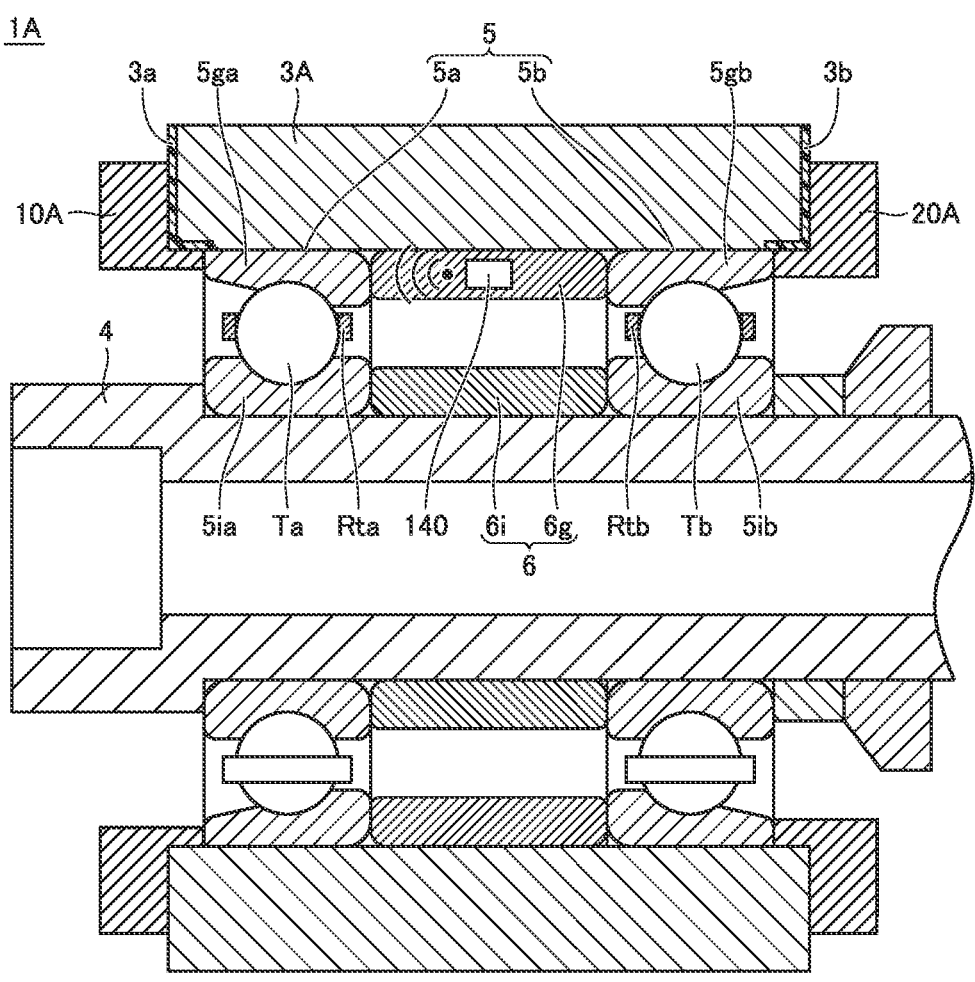
FIG. 3 is a cross-sectional view (No. 2) showing a schematic construction of a bearing apparatus.

FIG. 3 is a cross-sectional view showing a schematic construction of a bearing apparatus 1A according to the present second embodiment. In bearing apparatus 1A, the non-metallic layer described above is arranged in housing 3 instead of retaining lids 10 and 20. Specifically, bearing apparatus 1A is such a bearing apparatus that housing 3 and retaining lids 10 and 20 of bearing apparatus 1 shown in FIG. 1 described above have been changed to a housing 3A and retaining lids 10A and 20A. Bearing apparatus 1A is otherwise the same in construction as bearing apparatus 1 described above.

Retaining lids 10A and 20A are such retaining lids that non-metallic lavers 10a and 20a have been removed from retaining lids 10 and 20 described above, respectively.

In portions of housing 3A in contact with retaining lids 10A and 20A, non-metallic layers 3a and 3b composed of a non-metallic material are provided, respectively. Specifically, non-metallic layer 3a is provided in a part of the inside surface and an axial end portion on one side of housing 3A and non-metallic layer 3b is provided in a part of the inside surface and an axial end portion on the other side of housing 3A.

Thus, in bearing apparatus 1A according to the present second embodiment, data from communication module 140 can wirelessly be transmitted to the outside of bearing apparatus 1A through non-metallic layers 3a and 3b provided at opposing ends of housing 3. Thus, without providing a space for facilitating propagation of radio waves in the inside of housing 3A, data can wirelessly be transmitted to the outside.

Third Embodiment

Figure 4:
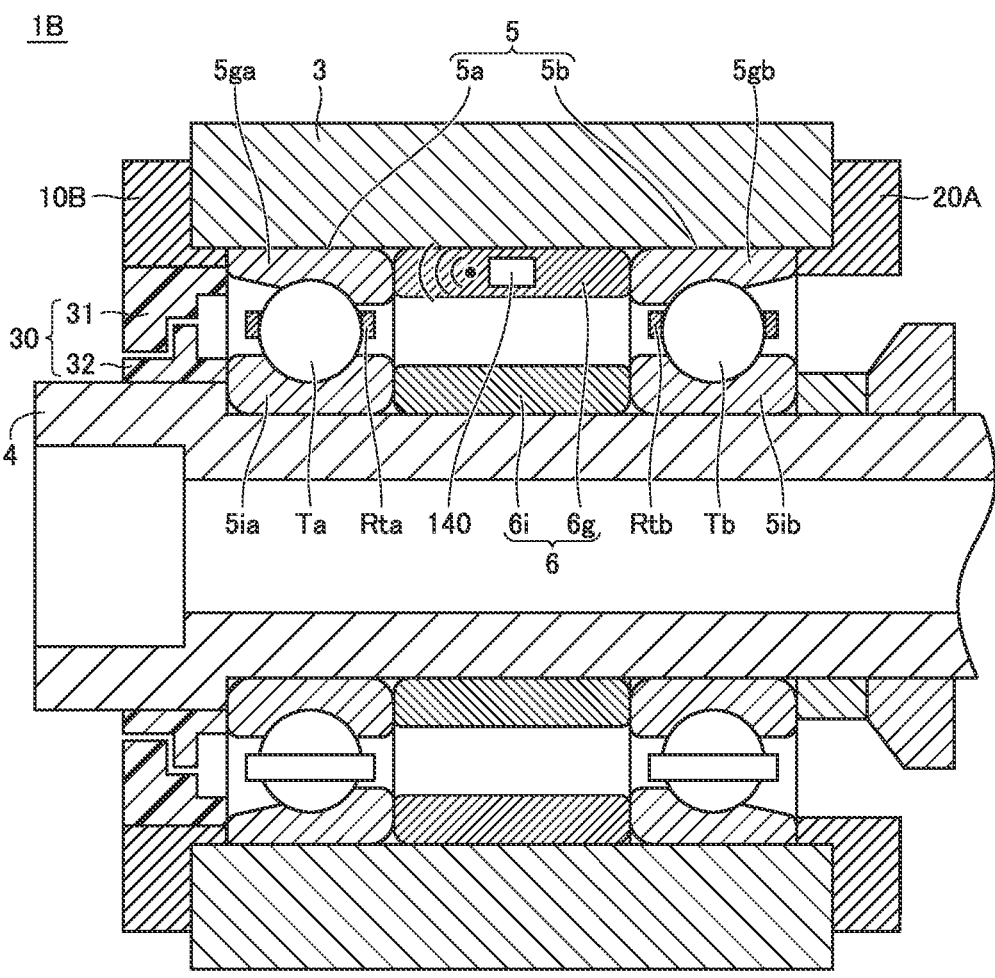
FIG. 4 is a cross-sectional view (No. 3) showing a schematic construction of a bearing apparatus.

FIG. 4 is a cross-sectional view showing a schematic construction of a bearing apparatus 1B according to the present third embodiment. Bearing apparatus 1B is such a bearing apparatus that housing 3A and retaining lid 10A in bearing apparatus 1A shown in FIG. 3 described above have been changed to housing 3 and a retaining lid 10B and an inner-ring spacer 32 has further been added. Bearing apparatus 1B is otherwise the same in construction as bearing apparatus 1A described above. Housing 3 of bearing apparatus 1B is the same as housing 3 of bearing apparatus 1 described above.

In bearing apparatus 1B according to the present third embodiment, a labyrinthine portion 30 for prevention of entry of a foreign matter (for example, a coolant for working or chips produced during working) from the outside of main spindle 4 is provided at a tip end portion of main spindle 4.

Labyrinthine portion 30 is formed from an inside portion 31 of retaining lid 10B and inner-ring spacer 32 arranged between an inside surface of retaining lid 10B and an outside surface of main spindle 4 and fitted to main spindle 4. A resin material is employed as a material for inside portion 31 of retaining lid 10B and inner-ring spacer 32 that form labyrinthine portion 30. In other words, labyrinthine portion 30 forms the non-metallic layer.

Thus, in bearing apparatus 1B according to the present third embodiment, data from communication module 140 can wirelessly be transmitted to the outside of bearing apparatus 1B through labyrinthine portion 30 (non-metallic layer). Therefore, without providing a space for facilitating propagation of radio waves in the inside of housing 3A, data can wirelessly be transmitted to the outside.

Though FIG. 4 shows an example in which the non-metallic layer is formed in both of inside portion 31 of retaining lid 10B and inner-ring spacer 32 that form labyrinthine portion 30, the non-metallic layer may be formed in only one of inside portion 31 of retaining lid 10B and inner-ring spacer 32.

It should be understood that the embodiments disclosed herein are illustrative and non-restrictive in every respect. The scope of the present disclosure is defined by the terms of the claims rather than the description of the embodiments above and is intended to include any modifications within the scope and meaning equivalent to the terms of the claims.

REFERENCE SIGNS LIST 1, 1A, 1B bearing apparatus; 3, 3A housing; 3a, 3b, 10a, 20a non-metallic layer; 4 main spindle; 5, 5a, 5b bearing; 5ga, 5gb outer ring; 5ia, 5ib inner ring; 6 spacer; 6g outer-ring spacer; 6i, 32 inner-ring spacer; 10, 10A, 10B, 20, 20A retaining lid; 11 heat flux sensor; 30 labyrinthine portion; 31 inside portion; 56 temperature sensor; 57 vibration sensor; 59 load sensor; 140 communication module; 141 communication apparatus; 142 power generation apparatus; 200 external apparatus; Rta, Rtb retainer; Ta, Tb rolling element

The invention claimed is:

1. A bearing apparatus comprising:
a cylindrical housing where a rotating body is accommodated;
a first bearing including an inner ring fixed to an outside surface of the rotating body and an outer ring fixed to an inside surface of the housing, the first bearing supporting the rotating body rotatably with respect to the housing;

a lid portion fitted to the inside surface of the housing while the lid portion is in contact with an axial end surface of the housing and an axial end surface of the outer ring; and
a communication apparatus arranged in a region opposed to the lid portion with the first bearing being interposed therebetween, the communication apparatus wirelessly communicating over electromagnetic waves, wherein
a labyrinthine portion is formed from i) an inside portion of the lid portion and ii) a member arranged between an inside surface of the lid portion and an outside surface of the rotating body, and
at least one of the inside portion of the lid portion and the member is composed of a non-metallic material for allowing the electromagnetic waves from the communication apparatus to pass to outside of the bearing apparatus.

2. The bearing apparatus according to claim 1, wherein
the communication apparatus is arranged in a region between the first bearing and a second bearing arranged at a position opposed to the lid portion with the first bearing being interposed therebetween, and
the bearing apparatus further comprises a self-generation apparatus arranged in the region between the first bearing and the second bearing, the self-generation apparatus supplying electric power to the communication apparatus.

3. The bearing apparatus according to claim 1, wherein the non-metallic material is ceramic.

4. The bearing apparatus according to claim 1, wherein the first bearing is an angular contact ball bearing.

5. The bearing apparatus according to claim 1, wherein the rotating body is a main spindle of a machine tool.

* * * * *